(12) United States Patent  
Lee

(10) Patent No.: US 11,066,010 B2  
(45) Date of Patent: Jul. 20, 2021

(54) APPARATUS FOR PROVIDING NOTIFICATION OF OPENING OR CLOSING OF SCISSOR DOORS FOR VEHICLE

(71) Applicants: Hyundai Motor Company, Seoul (KR); Kia Motors Corporation, Seoul (KR)

(72) Inventor: Jae Seung Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 177 days.

(21) Appl. No.: 16/533,165

(22) Filed: Aug. 6, 2019

(65) Prior Publication Data

US 2020/0339035 A1 Oct. 29, 2020

(30) Foreign Application Priority Data

Apr. 25, 2019 (KR) .......................... 10-2019-0048683

(51) Int. Cl.
*B60Q 1/50* (2006.01)
*B60J 5/06* (2006.01)

(52) U.S. Cl.
CPC . *B60Q 1/50* (2013.01); *B60J 5/06* (2013.01)

(58) Field of Classification Search
CPC ......... B60J 5/0472; B60J 5/06; B60Q 1/2657; B60Q 1/323; B60Q 1/50
See application file for complete search history.

(56) References Cited

U.S. PATENT DOCUMENTS

| 10,086,833 B1* | 10/2018 | Duan | G01S 15/87 |
| 2004/0124992 A1* | 7/2004 | Pulis | E05F 15/603 |
| | | | 340/686.1 |
| 2008/0218381 A1* | 9/2008 | Buckley | B60Q 1/50 |
| | | | 340/932.2 |

FOREIGN PATENT DOCUMENTS

KR 2004-0066555 A 7/2004

* cited by examiner

*Primary Examiner* — Omeed Alizada
(74) *Attorney, Agent, or Firm* — Mintz Levin Cohn Ferris Glovsky and Popeo, P.C.; Peter F. Corless

(57) ABSTRACT

An apparatus for providing a notification of opening or closing of scissor doors for a vehicle is intended to indicate an opening or closing state of the scissor doors installed in the vehicle. The apparatus includes: a first indicator unit installed in a left section of a rear side of the vehicle to indicate an opening state of a left scissor door; a second indicator unit installed in a right section of the rear side of the vehicle to indicate an opening state of a right scissor door; a motor for activating the first indicator unit and the second indicator unit; and a clutch unit to selectively activate the first indicator unit and the second indicator unit.

7 Claims, 8 Drawing Sheets

APPARATUS FOR PROVIDING NOTIFICATION OF OPENING OR CLOSING OF SCISSOR DOORS FOR VEHICLE

CROSS-REFERENCE TO RELATED APPLICATION(S)

This application claims under 35 U.S.C. § 119(a) the benefit of Korean Patent Application No. 10-2019-0048683, filed on Apr. 25, 2019, the entire contents of which are incorporated by reference herein.

BACKGROUND

(a) Technical Field

The present disclosure relates to an apparatus for providing a notification (i.e., an indication) of opening or closing of scissor doors for a vehicle, more particularly, to the apparatus that is intended to provide easy identification of an opening state of the scissor doors from a back of the vehicle when the scissor doors are opened.

(b) Description of the Related Art

Various types of doors are installed in vehicles.

The most common type of vehicle door is a regular swing door that is opened or closed by being pushed or pulled horizontally with respect to the ground. The regular door has a structure that prevents the door from being opened while the vehicle is traveling, which is advantageous in that the vehicle can travel in a stable manner. However, there is a disadvantage that a lot of space is required to open the door because the door is opened horizontally with respect to the ground when the door is opened.

In order to solve the disadvantage of such a regular door, various types of doors have been developed, one of which is a scissor door.

The scissor door refers to the manner of opening and closing the door, which is like scissors, and has an advantage in that the door is raised upward vertically with respect to the ground when the door is opened so that the door is capable of being opened and closed even in a narrow space.

However, such a scissor door also has a problem in that it is hard to recognize the door from the back of the vehicle because the door rotates and rises vertically with respect to the ground when the door is opened.

As such, there is a problem that when a passenger is exiting the vehicle after the scissor door is opened, the passenger is exposed to a risk of collision because the passenger exiting the vehicle and opening of the door are not recognized by other vehicles.

As the foregoing described as the background art is just to facilitate understanding of the background of the present disclosure, it must not be taken as an admission that it corresponds to the prior art well known to those who have ordinary skill in the art.

SUMMARY

The present disclosure provides an apparatus for providing a notification (i.e., an indication) of opening or closing of scissor doors for a vehicle, which is intended to provide easy identification of an opening state of the scissor doors from a back of the vehicle when the scissor doors are opened.

In accordance with one aspect of the present disclosure, there may be provided an apparatus for providing a notification of opening or closing of scissor doors for a vehicle, which is intended to indicate an opening/closing state of the scissor doors installed in the vehicle, comprising: a first indicator unit installed in a left section of a rear side of the vehicle to indicate an opening state of a left scissor door; a second indicator unit installed in a right section of the rear side of the vehicle to indicate an opening state of a right scissor door; a motor for activating the first indicator unit and the second indicator unit; and a clutch unit configured to be operated in conjunction with a main gear provided on a rotary shaft of the motor and selectively activate the first indicator unit and the second indicator unit.

The first indicator unit may include a first indicator and a first sliding bar provided to be moved in a leftward and rightward direction of the vehicle in the rear side of the vehicle, the first indicator being provided at a left end of the first sliding bar; the second indicator unit may include a second indicator and a second sliding bar provided to be moved in a leftward and rightward direction of the vehicle in the rear side of the vehicle, the second indicator being provided at a right end of the second sliding bar; and the clutch unit may serve to transmit power generated by the motor to one of the first and second sliding bars.

The first indicator unit may further include a first guide rail installed in the leftward and rightward direction of the vehicle in the rear side of the vehicle to guide leftward and rightward movement of the first sliding bar, and the second indicator unit may further include a second guide rail installed in the leftward and rightward direction of the vehicle in the rear side of the vehicle to guide leftward and rightward movement of the second sliding bar.

The first indicator unit and the second indicator unit may be configured to be operated selectively by operation of the clutch unit such that any one of the first and second indicators is protruded to an outside of the vehicle.

The clutch unit may include a clutch pin having at its end, a driven gear to be engaged with the main gear of the motor, and at the same time, selectively coupled to the first sliding bar and the second sliding bar; an electromagnet for moving the clutch pin by magnetic force generated selectively by application of electric power to couple the driven gear to one of the first and second sliding bars; and a spring for returning the clutch pin moved by the electromagnet to its original position.

The first and second indicators may include a light emitter for emitting light by application of electric power, respectively.

The apparatus may further include a control unit for detecting an opening state of the left and right scissor doors and activating the motor and the clutch unit in response to corresponding signal to selectively activate the first and second indicator units.

DESCRIPTION OF PREFERRED EMBODIMENTS

Figure 1:
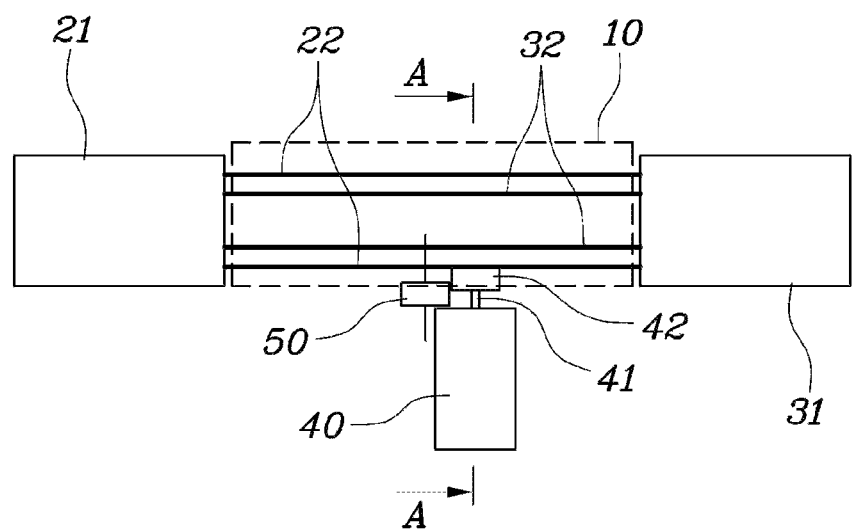
FIG. 1 is a configuration diagram illustrating an apparatus for providing a notification of opening or closing of scissor doors for a vehicle according to an embodiment of the present disclosure.

Preferred embodiments of the present disclosure will be described below in more detail with reference to the accompanying drawings. However, it is to be noted that the present disclosure is not intended to be limited to embodiments set forth below, but may be embodied in many various forms and that these embodiments are merely provided to complete the present disclosure and notify those skilled in the art of the scope of the present disclosure. Same reference numerals refer to same elements throughout the drawings.

Figure 2:
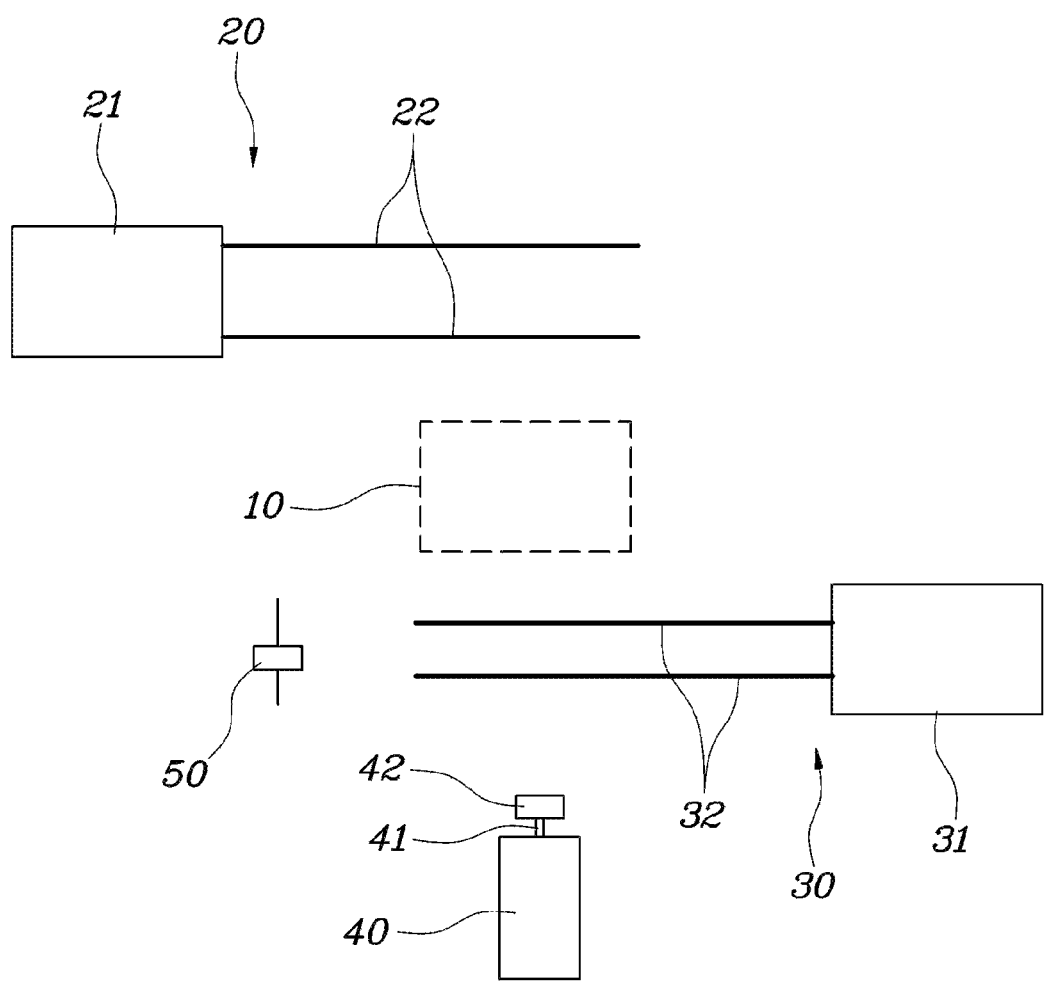
FIG. 2 is an exploded configuration diagram illustrating the apparatus for providing the notification of opening or closing of scissor doors for a vehicle according to an embodiment of the present disclosure.
Figure 3:
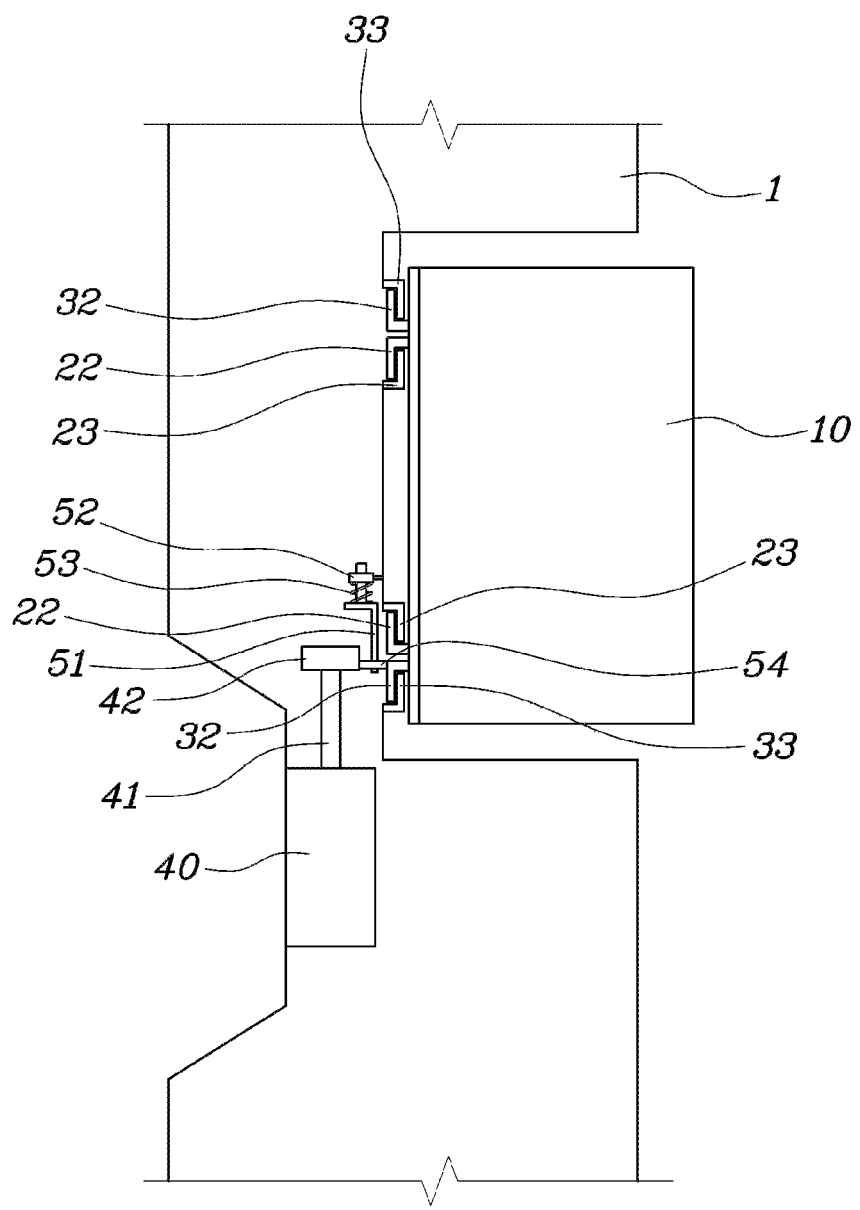
FIGS. 3 and 4 are side cross-section views illustrating the apparatus for providing the notification of opening or closing of scissor doors for a vehicle according to an embodiment of the present disclosure.
Figure 4:
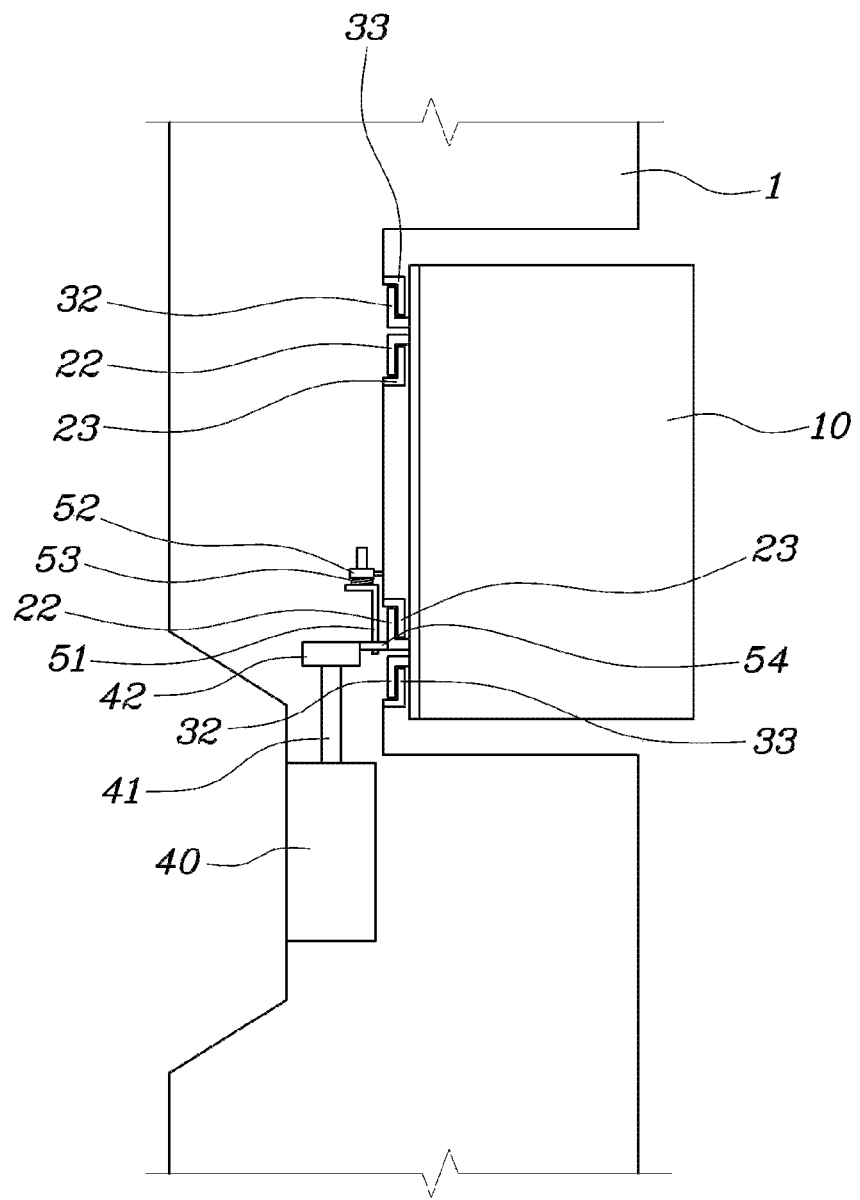

FIG. 1 is a configuration diagram illustrating an apparatus for providing a notification of opening or closing of scissor doors for a vehicle according to an embodiment of the present disclosure, FIG. 2 is an exploded configuration diagram illustrating the apparatus for providing the notification of opening or closing of scissor doors for a vehicle according to an embodiment of the present disclosure, and FIGS. 3 and 4 are side cross-section views illustrating the apparatus for providing the notification of opening or closing of scissor doors for a vehicle according to an embodiment of the present disclosure.

An apparatus for providing a notification of opening or closing of scissor doors for a vehicle according to an embodiment of the present disclosure is configured to indicate an opening or closing state of the scissor doors installed in the vehicle. Preferably, the apparatus is installed in a tailgate of the vehicle in order to facilitate identification from, in general, the back of the vehicle. It is understood that the apparatus for providing the notification of opening or closing of scissor doors for the vehicle is not limited to being installed in the tailgate of the vehicle, but may be installed in any section of the vehicle, preferably any section of the rear side of the vehicle where identification from the back of the vehicle can be made easily. Hereinafter, installation positions of the apparatus for providing the notification of opening or closing of scissor doors for the vehicle are collectively referred to as the rear side of the vehicle.

As shown in FIGS. 1-4 and 5A-5D, the apparatus for providing the notification of opening or closing of scissor doors for the vehicle, according to an embodiment of the present disclosure, includes: a first indicator unit 20 installed in a left section of a rear side 1 of the vehicle to indicate an opening state of a left scissor door; a second indicator unit 30 installed in a right section of the rear side 1 of the vehicle to indicate an opening state of a right scissor door; a motor 40 for activating the first indicator unit 20 and the second indicator unit 30; and a clutch unit 50 configured to be operated in conjunction with a main gear 42 provided on a rotary shaft 41 of the motor 40 so as to selectively activate the first indicator unit 20 and the second indicator unit 30.

The first indicator unit 20 and the second indicator unit 30 are different from each other only in directions in which they are operated and positions in which they are arranged. However, they are configured in a way of being arranged to be substantially opposite to each other with respect to a width center of the vehicle. For example, in this embodiment, a backup lamp 10 is arranged in the width center of the vehicle and the first indicator unit 20 and the second indicator unit 30 are arranged to be opposite from each other at left and right sides respectively while the backup lamp 10 is interposed therebetween.

As a result, the first indicator unit 20 notifies (i.e., indicates) an opening state of a scissor door arranged at the left side of the vehicle, while the second indicator unit 30 notifies (i.e., indicates) an opening state of a scissor door arranged at the right side of the vehicle.

The first indicator unit 20 includes a first indicator 21 and a first sliding bar 22 provided to be moved in a leftward and rightward direction of the vehicle in the rear side 1 of the vehicle wherein the first indicator 21 is provided at a left end of the first sliding bar. In addition, the first indicator unit 20 further includes a first guide rail 23 installed in the leftward and rightward direction of the vehicle in the rear side 1 of the vehicle to guide leftward and rightward movement of the first sliding bar 22.

The first indicator 21 is configured to facilitate identification from the back of the vehicle, and may be installed at an end of the first sliding bar 22 so as to move integrally with the first sliding bar 22 as the first sliding bar 22 is slid and moved toward the left side while protruding outwardly from the left side of the vehicle. To this end, the first indicator 21 includes a light emitter (not shown) for emitting light by application of electric power. As a result, the first indicator 21 makes it possible to further facilitate identification from the back of the vehicle by protruding outwardly from the left side of the vehicle, and at the same time, emitting light. In this case, the light emitter may be implemented by, for example, a light emitting diode (LED).

The first sliding bar 22 is installed in the rear side 1 of the vehicle to slide in the left and right direction and move the first indicator 21 integrally with it in the left and right direction. In this embodiment, the first sliding bar is preferably provided with a rack gear to be engaged with the main gear 42 such that it is moved in the left and right direction by rotation of the main gear 42 provided on the rotary shaft 41 of the motor 40. Therefore, the main gear 42 provided on the rotary shaft 41 of the motor 40 preferably serves as a pinion gear so that operation in the form a rack and pinion gear is performed. It is understood that the first sliding bar 22 and the main gear 42 are not limited to being operated in the form of a rack and pinion gear but rather may be modified in various ways, for example, embodied in such a way that the first sliding bar 22 is slid and moved in the left and right direction in conjunction with rotation of the main gear 42.

The first guide rail 23 is configured to hold a moving section and a moving posture while the first sliding bar 22 is moving in the left and right direction, which may be formed in a form of enclosing a part or all of the first sliding bar 22. For example, the first sliding bar 22 and the first guide rail 23 may have a "¬" shaped cross-section and a "L" shaped cross-section respectively as shown in FIGS. 3 and 4 such that they can be superimposed on each other to be in surface contact.

On the other hand, the first sliding bar 22 and the first guide rail 23 are preferably configured such that at least two or more sets thereof are arranged to be spaced apart vertically and parallel to each other in order to maintain the posture and smooth movement in the leftward and rightward direction of the first indicator 21.

Similarly to the first indicator unit 20, the second indicator unit 30 includes a second indicator 31 and a second sliding bar 32 provided to be moved in a leftward and rightward direction of the vehicle in the rear side 1 of the vehicle wherein the second indicator 31 is provided at a right end of the second sliding bar. In addition, the second indicator unit 30 further includes a second guide rail 33 installed in the leftward and rightward direction of the vehicle in the rear side of the vehicle to guide leftward and rightward movement of the second sliding bar 32.

In this case, the second indicator 31, the second sliding bar 32, and the second guide rail 33 are the same as the first indicator 21, the first sliding bar 22, and the first guide rail 23 in their configurations, respectively. Therefore, a detailed description of each configuration will be omitted.

However, it is noted that the first indicator unit 20 is configured to be moved in the leftward and rightward direction so as to cause the first indicator 21 to protrude outwardly from the left side of the vehicle and withdraw the first indicator from an outside by operation of the motor 40, while the second indicator unit 30 is configured to be moved in the leftward and rightward direction so as to cause the second indicator 31 to protrude outwardly from the right side of the vehicle and withdraw the second indicator from the outside by operation of the motor 40.

In this case, the first sliding bar 22 and the second sliding bar 32 are preferably spaced apart from each other at a predetermined interval and installed parallel to each other. Preferably, the first sliding bar 22 and the second sliding bar 32 are arranged to be spaced apart from each other with an interval falling within a range in which the first sliding bar 22 and the second sliding bar 32 can be operated selectively during operation of the clutch unit 50.

The motor 40 provides power for sliding the first sliding bar 22 and the second sliding bar 32 in the leftward and rightward direction. The motor is provided with the rotary shaft 41 to be rotated by operation of the motor 40 wherein an end of the rotary shaft 41 is provided with the main gear 42 which is engaged with the first sliding bar 22 and the second sliding bar 32 and interlocks the first sliding bar 22 and the second sliding bar 32 by operation of the motor 40. The main gear 42 is preferably formed in the form of a pinion gear such that it is operated together with the first and second sliding bars 22 and 32 in the form of a rack and pinion gear, as described above.

The clutch unit 50 is configured to transmit power generated by the motor 40, that is, rotational force of the main gear 42 to be rotated by operation of the motor 40, to one of the first sliding bar 22 and the second sliding bar 32. The clutch unit includes a clutch pin 51 having a driven gear 54 to be engaged with the main gear 42 of the motor 40, and at the same time, selectively coupled to the first sliding bar 22 and the second sliding bar 32; an electromagnet 52 for moving the clutch pin 51 by magnetic force generated selectively by application of electric power to couple the driven gear 54 to one of the first and second sliding bars 22 and 32; and a spring 53 for returning the clutch pin 51 moved by the electromagnet 52 to its original position.

As a result, when the clutch pin 51 is moved by adjusting magnetic force generated in the electromagnet 52, the driven gear 54 is selectively brought into contact with the first sliding bar 22 and the second sliding bar 32. Further, when electric power having been applied to the electromagnet 52 is cut off, magnetic force is lost, and at the same time, the clutch pin 51 returns to its original position due to restoring force of the spring 53.

On the other hand, although it is not shown in this embodiment, the apparatus may further include a control unit for detecting an opening state of the left and right scissor doors and activating the motor 40 and the clutch unit 50 in response to corresponding signal to selectively activate the first and second indicator units 20 and 30.

The control unit according to an exemplary embodiment of the present disclosure may be implemented by a non-volatile memory (not shown) configured to store an algorithm constructed to control operation of various components of the vehicle or data related to software commands for carrying out the algorithm as well as a processor (not shown) configured to perform operations described below by using the data stored in the memory. In this case, the memory and the processor may be implemented as separate chips. Alternatively, the memory and the processor may be implemented as a single chip in which they are incorporated. The processor may be constructed in the form of one or more processors.

Operation of the apparatus for providing a notification of opening or closing of scissor doors for a vehicle according to an embodiment of the present disclosure as configured above will now be described with reference to the accompanying drawings.

First, operation of the clutch unit will be described.

FIGS. 3 and 4 are side cross-section views illustrating an apparatus for providing a notification of opening or closing of scissor doors for a vehicle according to an embodiment of the present disclosure, wherein FIG. 3 is a view showing a state in which the clutch unit is in its original position and FIG. 4 is a view showing a state in which the clutch unit is operated.

The state in which the clutch unit 50 is in its original position refers to a state in which the driven gear 54 of the clutch unit 50 is engaged with the first sliding bar 22 while it is engaged with the main gear 42 of the motor 40, as shown in FIG. 3.

When the motor 40 is operated in this state, the main gear 42 is rotated, and at the same time, the driven gear 54 is rotated in conjunction with the main gear. As a result, the first sliding bar 22 is moved in the leftward direction by rotation of the driven gear 54, thereby causing the first indicator 21 to protrude outwardly from the left side of the vehicle so as to facilitate identification from the back of the vehicle.

In order to release the state in which the first indicator 21 has protruded outwardly from the left side of the vehicle, the motor 40 is operated in the reverse direction to move the first sliding bar 22 in the rightward direction so as to return the first indicator 21 to its original position.

On the other hand, in the state in which the clutch unit 50 is operated as shown in FIG. 4, magnetic force is generated when electric power is applied to the electromagnet 52, and thus the clutch pin 51 is moved toward the electromagnet 52 by magnetic force. As a result, the driven gear 54 provided on the clutch pin 51 is disengaged from the first sliding bar 22 and instead engaged with the second sliding bar 32. At this time, it is understood that the driven gear 54 is maintained in engagement with the main gear 42 of the motor 40.

When the motor 40 is operated in this state, the main gear 42 is rotated, and at the same time, the driven gear 54 is rotated in conjunction with the main gear. As a result, the second sliding bar 32 is moved in the rightward direction by rotation of the driven gear 54, thereby causing the second indicator 31 to protrude outwardly from the right side of the vehicle so as to facilitate identification from the back of the vehicle.

Similarly to returning of the first indicator 21, in order to release the state in which the second indicator 31 has protruded outwardly from the right side of the vehicle, the motor 40 is operated in the reverse direction to move the second sliding bar 32 in the leftward direction so as to return the second indicator 31 to its original position.

Although it is described herein that the driven gear 54 of the clutch pin 51 is engaged with the first sliding bar 22 in the state in which it is in its original position, the state in which the clutch pin 51 is in its original position may be set as a state in which the clutch pin is disengaged from both the first sliding bar 22 and the second sliding bar 32. In this case, by adjusting a moving distance of the clutch pin 51 through adjustment of electric power to be applied to the electromagnet 52, the state in which the driven gear 54 of the clutch pin 51 is moved to a position where it is engaged with the first sliding bar 22 is set as a first operating state, while the state in which the driven gear 54 of the clutch pin 51 is moved to a position where it is engaged with the second sliding bar 32 is set as a second operating state.

FIGS. 5A to 5D are diagrams illustrating operating states of the apparatus for providing a notification of opening or closing of scissor doors for a vehicle according to an embodiment of the present disclosure.

Figure 5A:
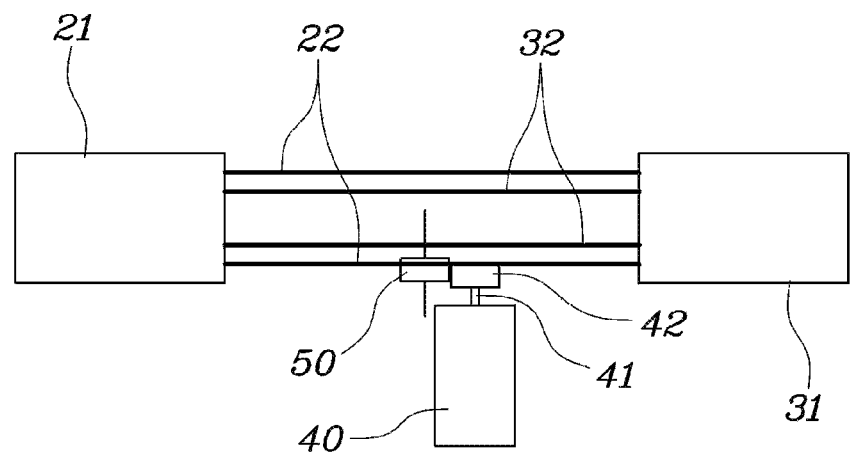
FIGS. 5A to 5D are diagrams illustrating operating states of the apparatus for providing the notification of opening or closing of scissor doors for a vehicle according to an embodiment of the present disclosure.
Figure 5B:
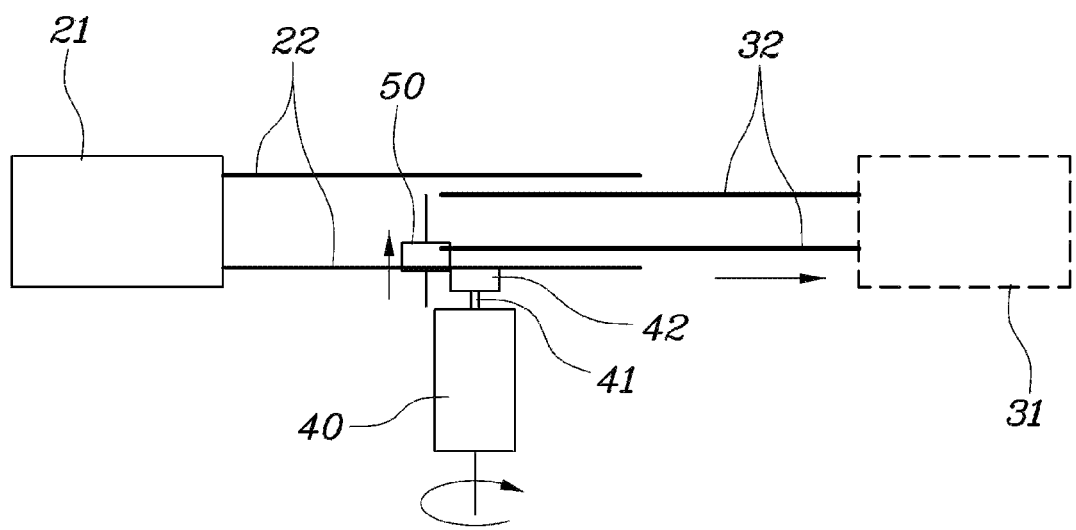

FIG. 5A is a diagram illustrating a state in which the clutch pin 51 is engaged with the first sliding bar 22, which is the same as the state of FIG. 3.

In this state, when the right scissor door of the vehicle is detected as being opened, the control unit controls a power source to apply electric power to the electromagnet 52. As a result, the electromagnet 52 generates magnetic force due to application of electric power thereto whereby the clutch pin 51 is moved by the magnetic force. Then, the driven gear 54 provided at the end of the clutch pin 51 is moved and engaged with the second sliding bar 32.

Subsequently, when the motor 40 is operated, the main gear 42 provided on the rotary shaft 41 is rotated forward by rotation of the motor 40, and at the same time, the driven gear 54 provided on the end of the clutch 51 is rotated forward in conjunction with the main gear. When the driven gear 54 is rotated forward as described above, the second sliding bar 32 engaged with the driven gear is moved in the rightward direction so that the second indicator 31 is moved in the rightward direction and thus protrude outwardly from the right side of the vehicle.

Then, the second indicator 31 protruded outwardly from the right side of the vehicle can be identified from the back of the vehicle so that it can be recognized that the right scissor door is opened.

At this time, if the second indicator 31 includes the light emitter, the light emitter included in the second indicator 31 emits light so that the second indicator 31 in a protruded state can be more easily identified.

Figure 5C:
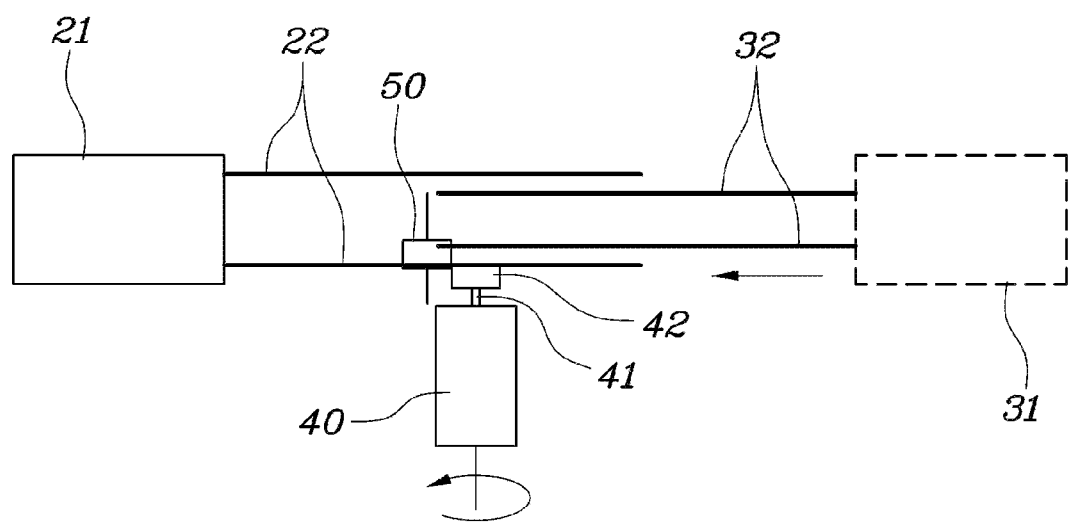

In this state, when the right scissor door is changed to a closed state, the control unit controls the motor 40 to rotate reversely so that the driven gear 54 and the second sliding bar 32 are rotated and moved reversely as shown in FIG. 5C.

Figure 5D:
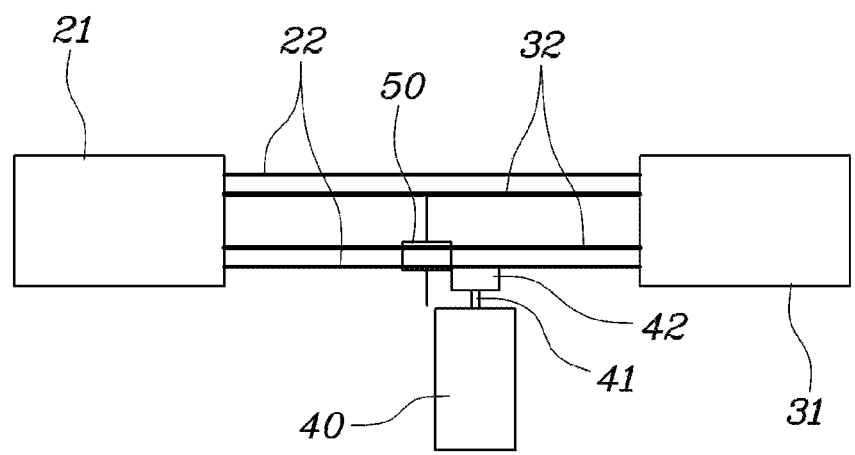

Further, as shown in FIG. 5D, when the second indicator 31 is returned to its original position, electric power applied to the electromagnet 52 is cut off to release magnetic force generated in the electromagnet 52. Then, the clutch pin 51 is returned to its original position by restoring force of the spring 53, as shown in FIG. 5A.

According to embodiments of the present disclosure, a state in which the scissor door is opening is detected and then the indicator that can be identified from the back of the vehicle is operated simultaneously with opening of the corresponding scissor door, thereby facilitating identification of the opened state of the scissor door from the back of the vehicle.

Accordingly, in the case where passengers exit the vehicle to which scissor doors are applied, the embodiments of the present disclosure make it possible to easily identify from the surrounding whether or not passengers are exiting the vehicle so that safety of exiting of the passengers can be improved.

Although the present disclosure has been described with reference to the accompanying drawings and the preferred embodiments as described above, the present disclosure is not limited thereto but defined by the following claims. Accordingly, those skilled in the art will appreciate that various modifications and changes may be made to the present disclosure without departing from the spirit and scope of the following claims.

What is claimed is:

1. An apparatus for providing a notification of opening or closing of scissor doors for a vehicle, which is intended to indicate an opening or closing state of the scissor doors installed in the vehicle, comprising:
    a first indicator unit installed in a left section of a rear side of the vehicle to indicate an opening state of a left scissor door;
    a second indicator unit installed in a right section of the rear side of the vehicle to indicate an opening state of a right scissor door;
    a motor for activating the first indicator unit and the second indicator unit; and
    a clutch unit configured to be operated in conjunction with a main gear provided on a rotary shaft of the motor and selectively activate the first indicator unit and the second indicator unit.

2. The apparatus of claim 1, wherein the first indicator unit comprises a first indicator and a first sliding bar provided to be moved in a leftward and rightward direction of the vehicle in the rear side of the vehicle, the first indicator being provided at a left end of the first sliding bar;
    the second indicator unit comprises a second indicator and a second sliding bar provided to be moved in a leftward and rightward direction of the vehicle in the rear side of the vehicle, the second indicator being provided at a right end of the second sliding bar; and
    the clutch unit serves to transmit power generated by the motor to one of the first and second sliding bars.

3. The apparatus of claim 2, wherein the first indicator unit further comprises a first guide rail installed in the leftward and rightward direction of the vehicle in the rear side of the vehicle to guide leftward and rightward movement of the first sliding bar; and
    the second indicator unit further comprises a second guide rail installed in the leftward and rightward direction of the vehicle in the rear side of the vehicle to guide leftward and rightward movement of the second sliding bar.

4. The apparatus of claim 2, wherein the first indicator unit and the second indicator unit are configured to be operated selectively by operation of the clutch unit such that any one of the first and second indicators is protruded to an outside of the vehicle.

5. The apparatus of claim 2, wherein the clutch unit comprises:
    a clutch pin having at its end, a driven gear to be engaged with the main gear of the motor, and at the same time, selectively coupled to the first sliding bar and the second sliding bar;
    an electromagnet for moving the clutch pin by magnetic force generated selectively by application of electric power to couple the driven gear to one of the first and second sliding bars; and
    a spring for returning the clutch pin moved by the electromagnet to its original position.

6. The apparatus of claim 5, wherein the first and second indicators comprise a light emitter for emitting light by application of electric power, respectively.

7. The apparatus of claim 1, further comprising a control unit for detecting an opening state of the left and right scissor doors and activating the motor and the clutch unit in response to corresponding signal to selectively activate the first and second indicator units.

\* \* \* \* \*